May 27, 1969 D. M. SANDEFUR 3,446,326
SLIDE AND BUMPER STRIP FOR ASSEMBLY TABLES
Filed Feb. 29, 1968
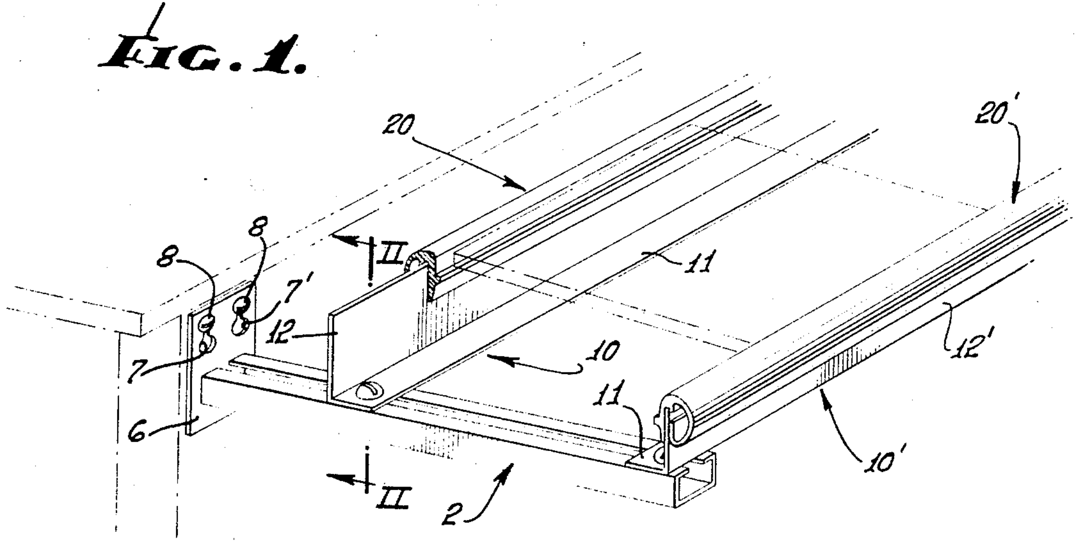
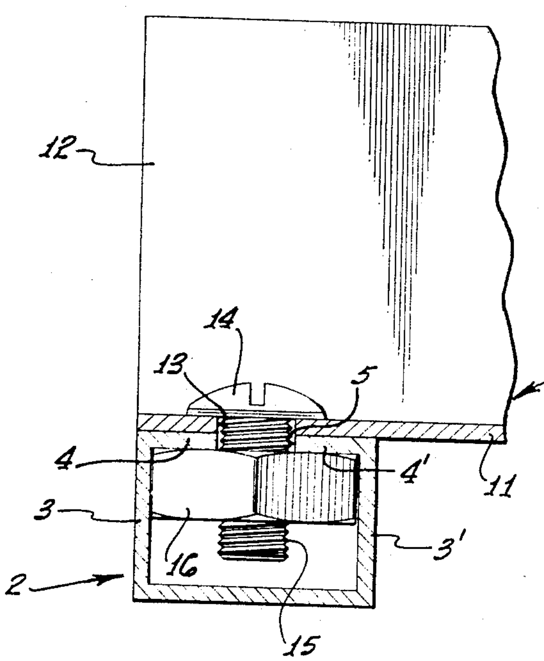
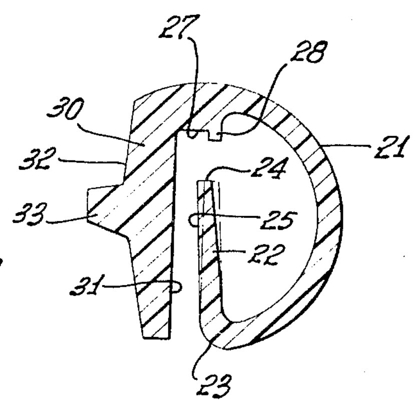
INVENTOR.
DOUGLAS SANDEFUR
BY
Miketta, Glenny, Poms & Smith
ATTORNEYS.

United States Patent Office 3,446,326
Patented May 27, 1969

3,446,326

SLIDE AND BUMPER STRIP FOR ASSEMBLY TABLES

Douglas M. Sandefur, Los Angeles, Calif., assignor to Sandefur Engineering Co., Inc., Lawndale, Calif., a corporation of California Filed Feb. 29, 1968, Ser. No. 709,325
Int. Cl. B65g *11/00, 11/16*
U.S. Cl. 193—38 5 Claims

ABSTRACT OF THE DISCLOSURE

Relates to construction of extruded polymer composition work supporting and bumper strips arranged to resiliently grasp upstanding rigid supports and provide low friction trackways for units of work being worked on at assembly tables.

*Background of the invention*

Elongated work tables and benches are often employed in the assembly and testing of various products and units. In many instances, it is desirable to be able to move the units, boards, frames, etc., upon which work is being done from station to station by sliding the workpieces from one operator to another. Since a single plant may produce products or units of the same type but of different sizes at different times, and may use the same assembly tables not only for units of a different size but perhaps for the assembly of products of totally different type, it is desirable to use tables and benches which can be readily and easily modified, adjusted or provided with trackways or slideways capable of accepting frames, wiring panels, boards or other sub-assemblies of different sizes and contours upon which the operators can work. Metal trackways are often unsatisfactory since they have a tendency to scratch or impair the workpieces; moreover, the hardness of metal tracks is a disadvantage in that the operators cannot comfortably rest their forearms on such tracks. In many instances, the workpiece should be electrically shielded or insulated from the track or table.

*Brief summary of the invention*

This invention relates to a clip-on type of accessory which can be attached to the side of a bench (or series of tables) and provide parallel supports adapted to receive boards, frames or other units upon which various devices, electronic sub-assemblies, etc., are to be installed, and moved or slid from work station to work station as the assembly or installation proceeds. Moreover, the supports or parallel rails can be quickly adjusted for space therebetween, thereby permitting the same accessory to be used on boards of different sizes. The invention also provides inexpensive, unitary, self-retaining elongated track and bumper slides which provide a low friction insulated trackway for the boards and units, the slides being self-retaining and resiliently grasping rigid metallic supports. When made from extruded polymer compositions which are preferred, these slides can bridge spaces between tables, afford stable support for the work and provide curved bumper-like surfaces upon which operators may rest their hands and forms without fatigue, excessive localized pressure, danger of metal splinters, etc. Delicate or finished-surface sub-assemblies and units may be easily moved along the slides without damage or scratching. In the event a slide and bumper becomes damaged, burned, etc., it may be quickly removed and another new bumper slide installed. The elongated, preferably extruded and preferably polymer composition bumper slides are each provided with a longitudinally extending slot having a pair of opposing surfaces adapted to resiliently grasp an upstanding web of a support bar. In their freshly extruded form, these opposing surfaces are slightly inclined to each other, this construction taking advantage of the resilient or elastic character of at least one portion of the bumper slide to insure a good grasp upon the supporting web.

An object of the present invention therefore is to disclose and provide a self-retaining, unitary bumper and slide strip extruded from moldable polymer composition and adapted to resiliently grasp a rigid web of a support bar so as to provide a low friction surface capable of supporting workpieces at an assembly table.

A further object of the invention is to disclose and provide an adjustable and replaceable low friction slide and support for workpieces at assembly benches and the like, the construction involving bracket arms upon which a pair of support arms may be held, and means for adjustably positioning at least one of the bars in a selected parallel spacing with respect to the other bar, the upper marginal portion of each of such support bars being provided with a pre-molded plastic composition slide and bumper strip.

Other objects and advantages of the invention will become apparent from the description of an exemplary form of construction. In such description, reference will be had to the appended drawing in which:

FIG. 1 is a perspective view of the end portion of an adjustable trackway provided with the bumper and slide strips of the present invention;

FIG. 2 is an enlarged section taken through a bracket arm shown in FIG. 1, the section being taken along plane II—II in FIG. 1;

FIG. 3 is an enlarged transverse section taken through one of the bumper and slide strips used in FIG. 1.

In FIG. 1 there is illustrated one of at least a pair of bracket arms 2 carrying at one end means 6 for attaching such arm to a table or work bench shown in dash lines. The attachment means may take various forms; as illustrated, such means comprise a plate 6 provided with a pair of parallel slots 7 and 7′, each having an enlarged lower end adapted to receive the head of a screw or bolt fastened to a table or table leg, the narrower slot engaging the head of such screw or bolt 8. The plate 6 may be welded directly to the end of arm 2.

Each of the bracket arms 2 may comprise a channel with inturned lips defining a slot; as best seen in FIG. 2, the bracket arm 2 may have a bottom as well as the upstanding sides 3 and 3′, the sides being provided with inturned lips 4 and 4′. A longitudinal slot 5 is thus formed between the lips.

Although FIG. 1 only shows one arm, it is to be understood that two or more of such arms are generally employed, depending upon the length of the trackway desired.

A pair of support bars 10 and 10′ rest upon and extend transversely of the arms 2. As shown, each of the support bars includes a foot portion 11 and an upstanding web 12. The upstanding webs may be of the same width or height or the front bar 10′ may be provided with a web 12′ which is of lower height. Means are provided for adjustably positioning at least one of said bars in a selected parallel spacing with respect to the other bar. A simple form of adjustable spacing is illustrated in the drawings, particularly in FIG. 2. The foot 11 of support bar 10 is provided with a port 13 adapted to freely receive the shank 15 of a bolt 14. This bolt may be provided with a slotted head, a socket head or hexagonal head. Nonrotatably positioned within the arm 2 but slidable therein against the inner surfaces of the upstanding walls 3 and 3′, is a nut 16 in threaded engagement with the threaded shank 15 of the bolt 14. It will be evident that simply by loosening the bolt, the support bar 10 can be moved toward or away from the support bar 10′. It is to be understood that all other arms upon which the support bar 10 rests are similarly adjustably connected to the other arms. A similar adjustable connection may exist between the support bar 10' and the arms.

A unitary bumper and slide strip 20 and 20', preferably extruded from a moldable polymer composition is firmly but removably held by the upper marginal portion of each upstanding web of a support bar. Although in FIG. 1 the support bar 20 has been broken off (in order to facilitate understanding), these slide and bumper strips are of long length and may bridge the distance between adjacent assembly tables so as to provide a continuous trackway upon which numerous workpieces may be moved with great facility from one work station to another.

By referring to FIG. 3, it will be noted that each of these bumper strips includes a virtually tubular, elongated body portion 21 provided with a substantially smooth outer convex surface which may be convex or cylindrical over a subtended arc of between about 180° and 270°. This body portion is relatively thin walled. A concealed grasping web 22 extends from the longitudinal marginal portion 23 of such body 21 toward the axis of such body and terminates at a free edge 24. A work supporting leg 30, integral with the other longitudinal margin of the body portion 21, has an inner face 31 extending from a recess 27 (provided with a lip 28) formed in the inner surface of the tubular body. The face 31 of the work supporting leg 30 lies in a plane virtually parallel to but spaced from the grasping web 22.

It may be noted that in extruded form, the grasping web 22 is slightly biased toward the work support leg 30, the inner end portion of the web 22 being closer to inner face 31 of the leg than its outer end portion at margin 23 as shown in full lines in FIG. 3. The resiliency of the plastic composition of the cylindrical body 21 is thus most effectively utilized in having a rigid supporting web strongly grasped by surfaces 25 and 31.

The outer face 32 of the leg 30 is provided with an outwardly and longitudinally extending rib 33. Preferably upward work supporting surface of the rib 33 and the adjacent face 32 of such rib are at an obtuse angle which may vary from 90° to 120°.

These extruded plastic composition strips are applied to the upper marginal edges of the webs 12 of the support bars by simply pressing the strip onto such marginal edge portion, the spaced work supporting rib and the resilient web defining a longitudinal slot which is adapted to receive the rigid web and guide such web into the recess 27 so that the web is firmly retained in the recess, not only by the resilient web 22, but also by engagement with the recess and its lip 28. The final position of the resilient web 22 is shown in dash lines. It will be evident that the elastic and resilient characteristic of plastic composition, particularly in the body portion 21, is utilized in pressing the web 22 against a marginal portion of a supporting web.

It will also be evident that bumper and slide strips of identical cross-section can be used on webs of support bars 10 and 10', provided the work supporting leg 30 and the ribs 33 are facing each other when the two strips are in parallel position. A board, frame or other workpiece (shown in dotted lines in FIG. 1), can be supported on these opposing ribs and very readily moved longitudinally of the strip since the plastic compositions such as polyvinyl polymers, polyethylene polymers, polystyrene and polyamid polymers and various copolymers, whether thermoplastic or thermosetting, exhibit smooth surfaces of low friction coefficient. Moreover, it will be noted that the round portions of the strip are somewhat resilient and operators may lean their forearms or hands on such portions while making adjustments, welding or performing other assembly operations, without pain, injury or shock. In the event a slide and bumper strip is damaged, the entire strip can be rapidly removed and a new one inserted.

All changes and modifications coming within the scope of the appended claims are embraced thereby.

I claim:

1. A self-retaining, unitary bumper and slide strip extruded from moldable polymerized plastic composition and adapted to resiliently grasp a rigid web of a support bar, comprising:
  - a virtually tubular, elongated body portion provided with a smooth outer convex surface subtending more than 180° of arc;
  - a concealed grasping web extending from one longitudinal margin of said tubular body portion inwardly toward the axis thereof;
  - a work supporting leg integral with the other longitudinal margin of said tubular body, said leg having an inner surface extending from a recess formed in the inner surface of the tubular body into a plane virtually parallel to but spaced from said grasping web;
  - said spaced leg and web defining a longitudinal slot adapted to receive a rigid web of a support bar,
  - the outer surface of said leg carrying an outwardly and longitudinally extending rib for slidably supporting a workpiece.

2. A unitary bumper and slide strip as stated in claim 1 wherein the outer surface of the rib facing away from said slot lies in a plane at an angle of between about 90° and 125° with the confluent outer face of the leg.

3. A bumper and slide strip as stated in claim 1 wherein the convex surface of the tubular body portion is substantially cylindrical and subtends between about 180° and 270° of arc, the grasping web is integral with the longitudinal margin of the tubular body portion but includes a free longitudinal edge within said tubular body portion, and said free longitudinal edge is biased toward the inner surface of the work supporting leg, said spaced leg and web defining a longitudinal slot adapted to receive a rigid web of a support bar, guide it to said recess and resiliently hold it in position.

4. In combination with a pair of parallel, upstanding, spaced support webs, the provision of a removable, self-retaining bumper slide strip grasping the upper marginal edge of each support web, each of said strips being made from a polymerized plastic composition and comprising:
  - a virtually tubular elongated body portion provided with a smooth outer convex surface subtending between 180° and 270° of arc;
  - a concealed grasping web extending from one longitudinal margin of said tubular body portion and terminating in a free edge within said body portion;
  - a work supporting leg integral with the other longitudinal margin of said tubular body, said leg having an inner surface extending from a recess formed in the inner surface of the tubular body into a plane virtually parallel to but spaced from said grasping web;
  - the outer surface of said leg carrying an outwardly and longitudinally extending rib for slidably supporting a workpiece;
  - said spaced leg and web defining a longitudinal slot receiving the rigid web of a support bar and resiliently holding the strip thereon.

5. A bumper and slide strip as claimed in claim 1 in which the outer surface of the rib facing away from said slot lies in a plane at an angle of between about 90° and 125° with the immediately adjacent outer surface of the leg.

References Cited

UNITED STATES PATENTS

| | | | |
|---|---|---|---|
| 1,421,540 | 7/1922 | Noll | 193—41 |
| 2,669,361 | 2/1954 | Just | 193—38 |
| 3,031,245 | 4/1962 | Phillips | 193—38 |
| 3,063,534 | 11/1962 | Amour | 193—38 |

ANDRES H. NIELSEN, *Primary Examiner.*